United States Patent
Centonza et al.

(10) Patent No.: US 9,736,742 B2
(45) Date of Patent: Aug. 15, 2017

(54) OPTIMIZED DETECTION OF UNNECESSARY INTER-RAT HANDOVER

(71) Applicant: Telefonaktiebolaget LM Ericsson (publ), Stockholm (SE)

(72) Inventors: Angelo Centonza, Winchester (GB); Stefan Engström, Linköping (SE); Claes-Göran Persson, Mjölby (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/100,126

(22) PCT Filed: Oct. 5, 2015

(86) PCT No.: PCT/SE2015/051051
§ 371 (c)(1),
(2) Date: May 27, 2016

(87) PCT Pub. No.: WO2016/072904
PCT Pub. Date: May 12, 2016

(65) Prior Publication Data
US 2017/0026882 A1   Jan. 26, 2017

Related U.S. Application Data

(60) Provisional application No. 62/076,941, filed on Nov. 7, 2014.

(51) Int. Cl.
*H04W 36/00* (2009.01)
*H04W 24/02* (2009.01)
(Continued)

(52) U.S. Cl.
CPC ......... *H04W 36/0094* (2013.01); *H04L 43/16* (2013.01); *H04W 24/02* (2013.01);
(Continued)

(58) Field of Classification Search
USPC .......................... 455/440, 436, 437; 370/252
See application file for complete search history.

(56) References Cited

U.S. PATENT DOCUMENTS 9,516,557 B2 * 12/2016 Zhu .................. H04W 36/0022
2010/0234026 A1 * 9/2010 Tenny ............... H04W 36/0061
455/436

(Continued)

FOREIGN PATENT DOCUMENTS

WO   2013127480 A1   9/2013

OTHER PUBLICATIONS

3GPP, "3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12)", 3GPP TS 48.018 V12.3.0, Sep. 2014, 1-190.

(Continued)

*Primary Examiner* — David Q Nguyen
(74) *Attorney, Agent, or Firm* — Murphy, Bilak & Homiller, PLLC

(57) ABSTRACT

According to an aspect, a network node operating in a first RAN according to a first RAT receives a handover request for a user equipment from a cell in a second RAN operating according to a second RAT. After handover of the user equipment to a cell in the first RAN is completed, the network node configures the user equipment to measure frequencies corresponding to the second RAN. Based on measurements reported by the user equipment for the frequencies, the network node identifies detected cells exceeding a measurement threshold, and sends a handover report towards the second RAN. The handover report includes, for at least one detected cell exceeding the measurement threshold, a physical cell identifier and a frequency identifier for the detected cell. The network node obtains configuration (Continued)

information for the detected cell, from another node, and uses the obtained configuration information for subsequent mobility procedures.

21 Claims, 18 Drawing Sheets

(51) Int. Cl.
| | |
|---|---|
| *H04L 12/26* | (2006.01) |
| *H04W 28/18* | (2009.01) |
| *H04W 36/10* | (2009.01) |
| *H04W 36/14* | (2009.01) |
| *H04L 12/70* | (2013.01) |
| *H04W 88/12* | (2009.01) |
| *H04W 88/16* | (2009.01) |

(52) U.S. Cl.
CPC ....... *H04W 28/18* (2013.01); *H04W 36/0061* (2013.01); *H04W 36/10* (2013.01); *H04L 2012/5625* (2013.01); *H04W 36/0066* (2013.01); *H04W 36/0083* (2013.01); *H04W 36/14* (2013.01); *H04W 88/12* (2013.01); *H04W 88/16* (2013.01)

(56) References Cited

U.S. PATENT DOCUMENTS

| | | | | |
|---|---|---|---|---|
| 2010/0317349 | A1* | 12/2010 | Serravalle | H04W 24/10 455/440 |
| 2012/0207040 | A1* | 8/2012 | Comsa | H04W 72/1215 370/252 |
| 2014/0155065 | A1* | 6/2014 | Centonza | H04W 36/0066 455/436 |
| 2014/0301214 | A1* | 10/2014 | Zhang | H04W 36/18 370/252 |
| 2015/0289189 | A1* | 10/2015 | Yang | H04W 36/30 455/437 |

OTHER PUBLICATIONS

3GPP, "3rd Generation Partnership Project; Technical Specification Group GSM/EDGE Radio Access Network; Mobile Switching Centre—Base Station System (MSC-BSS) interface; Layer 3 specification (Release 12)", 3GPP TS 48.008 V12.0.0, Sep. 2014, 1-227.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.
3GPP, "3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.3.0, Sep. 2014, 1-290.
3GPP, "3rd Generation Partnership Project; Technical Specification Group Radio Access Network; UTRAN Iu interface Radio Access Network Application Part (RANAP) signalling (Release 12)", 3GPP TS 25.413 V12.2.0, Jun. 2014, 1-441.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.0.0, Sep. 2014, 1-308.
Unknown, Author, "Analysis of Unnecessary IRAT HO Enhancements", Ericsson, 3GPP TSG-RAN3 Meeting #86, R3-142897, San Francisco, Nov. 17-21, 2014, 1-4.
Unknown, Author, "Change Request; HO Report Enhancements to reduce IRAT configuration", Ericsson, 3GPP TSG-RAN WG3#86, R3-142899, San Francisco, Nov. 17-21, 2014, 1-2.
Unknown, Author, "Change Request; HO Report Enhancements to reduce IRAT configuration", Ericsson, 3GPP TSG-RAN WG3#86, R3-143075, San Francisco, Nov. 17-21, 2014, 1-7.
Unknown, Author, "Response LS on the routing information for the unnecessary handover to another RAT detection", 3GPP TSG RAN WG3 Meeting #85bis, R3-142602, Shanghai, China, Oct. 6-10, 2014, 1-1.
Unknown, Author, "Support for extended E-ARFCN value range in GERAN (unnecessary IRAT HO)", 3GPP TSG-GERAN Meeting #63, GP-140693, Alcatel-Lucent, Ljubljana, Slovenia, Aug. 25-29, 2014, 1-5.
Unknown, Author, "Support for extended E-ARFCN value range in GERAN (unnecessary IRAT HO)", 3GPP TSG-GERAN Meeting #63, GP-140695, Alcatel-Lucent, Ljubljana, Slovenia, Aug. 25-29, 2014, 1-8.
Unknown, Author, "Way Forward on GERAN LS on routing information for unnecessary handover", Alcatel-Lucent, 3GPP TSG-RAN WG3 Meeting #85bis, R3-142539, Shanghai, China, Oct. 6-10, 2014, 1-2.

\* cited by examiner

| 8 | 7 | 6 | 5 | 4 | 3 | 2 | 1 | |
|---|---|---|---|---|---|---|---|---|
| colspan="8" | Field Element identifier | octet 1 |
| colspan="8" | Length | octet 2 |
| Spare | REP_QUANT | colspan="6" | REPORTING_THRESHOLD | octet 3 |
| colspan="8" | Measurement Duration | octet 4 |
| colspan="8" | E-ARFCN | octets 5-6 |
| colspan="4" | Spare | colspan="4" | Measurement Bandwidth | octet 7 |
| colspan="8" | E-ARFCN | octets 8-9 |
| colspan="4" | Spare | colspan="4" | Measurement Bandwidth | octet 10 |
| colspan="8" | ... | ... |
| colspan="8" | E-ARFCN | octets m-(m+1) |
| colspan="4" | Spare | colspan="4" | Measurement Bandwidth | octet m+2 |

*FIG. 3*

| IE/Group Name | Presence | Range | IE type and reference | Semantics description | Criticality | Assigned Criticality |
|---|---|---|---|---|---|---|
| RSRP | O | | INTEGER (0..97) | Threshold of RSRP. | - | - |
| RSRQ | O | | INTEGER (0..34) | Threshold of RSRQ. | - | - |
| IRAT Measurement Parameters | M | | | | - | - |
| >Measurement Duration | M | | INTEGER (1..100) | The period of time following the successful IRAT handover, during which the target RAT instructs the UE to measure cells of the source RAT. Unit: [second]. | - | - |
| >E-UTRA frequencies | | 0 to <maxn oofEU TRAFr eqs> | | If present, designates the specific E-UTRAN frequencies which the target RAT may instruct the UE to measure. | - | - |
| >>E-ARFCN | M | | INTEGER (0..65535) | EARFCN of the downlink carrier frequency TS 36.101 [58]. | - | - |
| >>Measurement Bandwidth | O | | ENUMERATED(6,15,25,50,75,100) | Measurement bandwidth of the carrier frequency as defined in TS 25.331 [10]. | - | - |
| >>E-ARFCN-Extended | O | | INTEGER (65536..262143, ...) | EARFCN of the downlink carrier frequency TS 36.101 [58]. If this IE is present, the value signalled in the IE "E-ARFCN" is ignored. | YES | reject |

*FIG. 4*

| IE/Group Name | Presence | Range | IE type and reference | Semantics description |
|---|---|---|---|---|
| HO Type | M | | ENUMERATED (LTE to UTRAN, LTE to GERAN, ...) | |
| HO Report Type | M | | ENUMERATED (Unnecessary HO to another RAT, ..., Early IRAT Handover) | The "Early IRAT Handover" code-point shall be used by the RNC according to TS 25.413 [19] |
| HO Source ID | M | | IRAT Cell ID B.1.8 | Contains the cell ID of the source cell for the HO. This IE shall contain an E-UTRAN CGI, and shall be set to the same value as the *Reporting Cell Identifier* IE in TS 48.018 [18] |
| HO Target ID | M | | IRAT Cell ID B.1.8 | Contains the cell ID of the target cell for the HO. This IE shall contain either a UTRAN Cell ID or a GERAN Cell ID. |
| Candidate Cell List | | 1..<*maxn oofCan didate Cells*> | | |
| >Candidate Cell ID | M | | IRAT Cell ID B.1.8 | This IE shall contain an E-UTRAN CGI. |

*FIG. 5*

| IE/Group Name | Presence | Range | IE type and reference | Semantics description |
|---|---|---|---|---|
| CHOICE *Reporting RAT* | M | | | |
| >*E-UTRAN* | | | | |
| >>Cell Identifier | M | | OCTET STRING | Contains the E-UTRAN CGI IE as defined in 9.2.1.38. |
| >*UTRAN* | | | | |
| >>Cell Identifier | M | | OCTET STRING | Contains the *Source Cell Identifier* IE as defined in TS 25.413. |
| >*GERAN* | | | | |
| >>Cell Identifier | M | | OCTET STRING | Contains the *Cell Identifier* IE as defined in TS 48.018. |
| >*eHRPD* | | | | |
| >>eHRPD Sector ID | M | | B.1.18 | |

*FIG. 6*

| IE/Group Name | Presence | Range | IE type and reference | Semantics description |
|---|---|---|---|---|
| PLMN Identity | M | | 9.2.3.8 | |
| Cell Identity | M | | BIT STRING (28) | The leftmost bits of the Cell Identity correspond to the eNB ID (defined in subclause 9.2.1.37). |

*FIG. 7*

| IE/Group Name | Presence | Range | IE type and reference | Semantics description |
|---|---|---|---|---|
| HO Type | M | | ENUMERATED (LTE to UTRAN, LTE to GERAN, ...) | |
| HO Report Type | M | | ENUMERATED (Unnecessary HO to another RAT, ..., Early IRAT Handover) | The "Early IRAT Handover" code-point shall be used by the RNC according to TS 25.413 [19]. |
| HO Source ID | M | | IRAT Cell ID B.1.8 | Contains the cell ID of the source cell for the HO. This IE shall contain an E-UTRAN CGI, and shall be set to the same value as the *Reporting Cell Identifier* IE in TS 48.018 [18] |
| HO Target ID | M | | IRAT Cell ID B.1.8 | Contains the cell ID of the target cell for the HO. This IE shall contain either a UTRAN Cell ID or a GERAN Cell ID. |
| Candidate Cell List | | 1..<maxnoofCandidateCells> | | |
| >Candidate Cell ID | M | | IRAT Cell ID B.1.8 | This IE shall contain an E-UTRAN CGI. |
| Candidate PCI List | | 0..<maxnoofCandidatePCIs> | | |
| >Candidate PCI | M | | B.1.xx | This IE shall include the Physical Cell Identifier and the corresponding EARFCN of detected cells not included in the *Candidate Cell List* IE and for which an E-UTRAN CGI could not be derived |

*FIG. 10*

| Range bound | Explanation |
|---|---|
| maxnoofCandidateCells | Maximum no. of candidate cells. |
| maxnoofCandidatePCIs | Maximum no. of candidate PCIs. |

FIG. 11

| IE/Group Name | Presence | Range | IE type and reference | Semantics description |
|---|---|---|---|---|
| PCI | M | | Integer (0,..., 503) | Physical Cell Identity of the detected cell |
| EARFCN | M | | INTEGER (0 .. maxEARFCN, ...) | EARFCN of the detected cell. The relation between EARFCN and carrier frequency (in MHz) are defined in TS 36.104 [39]. |

| Range bound | Explanation |
|---|---|
| maxEARFCN | Maximum value of EARFCNs. Value is 262143. |

*FIG. 12*

OPTIMIZED DETECTION OF UNNECESSARY INTER-RAT HANDOVER

TECHNICAL FIELD

The technology disclosed herein relates generally to wireless communication networks, and more particularly relates to techniques for reducing unnecessary handovers from one radio access technology to another.

BACKGROUND

Wireless phones and other user equipment supporting a fourth-generation (4G) wireless technology such as the Long Term Evolution (LTE) technology, formally known as Evolved Universal Terrestrial Radio Access (E-UTRA), typically also support a 3G technology, such as the Universal Terrestrial Radio Access (UTRA) technology often referred to as Wideband Code-Division Multiple Access (WCDMA). These same devices might also be compatible with 2G networks, such as the Global System for Mobile Communications (GSM)/EDGE Radio Access Network (GERAN).

These networks may be connected to one another and, in some circumstances, may permit a user equipment (UE) to be handed over from one to another. As shown in FIG. 1, the LTE and GERAN/UTRAN architectures are combined by means of interfaces between the core network nodes of each respective technology. See "General Packet Radio Service (GPRS) enhancements for Evolved Universal Terrestrial Radio Access Network (E-UTRAN) access," 3GPP TS 23.401, ver. 13.0.0 (September 2014), available at www.3gpp.org. These core nodes include, for example, the Mobility Management Entity (MME), the Serving GPRS Support Node (SGSN), the Serving Gateway (SGW), and the Home Subscriber Server (HSS), all of whose functions are well known to those generally familiar with the family of network standards developed by members of the $3^{rd}$-Generation Partnership Project (3GPP).

One of the ways for the LTE and GERAN/UTRAN technologies to communicate with each other is via the RAN Information Management (RIM) protocol, which allows transferring of information from LTE to GERAN/UTRAN and vice-versa in a pre-configured manner. The RIM protocol is specified in "$3^{rd}$ Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12)," 3GPP TS 48.018, v. 12.3.0 (September 2014), also available at www.3gpp.org.

In the current specifications, a specific type of RIM interaction is defined for the purpose of avoiding unnecessary handovers from LTE to GERAN/UTRAN networks. This interaction is known as "Unnecessary IRAT Handover detection."

FIG. 2 shows a message sequence chart for the Unnecessary Inter Radio Access Technology (IRAT) Handover detection procedure, as per the current standards, where the target RAT is GERAN. A similar message sequence is also valid when the target RAT is UTRAN.

The operations illustrated in FIG. 2 are described in detail in 3GPP TS 48.018 (cited above), 3GPP TS 36.413 (Release 12), 3GPP TS 25.413 (Release 12), and 3GPP TS 48.008 (Release 12), all of which can be found at www.3gpp.org. The illustrated procedure allows the LTE radio access network (RAN) to configure specific measurement criteria and thresholds for a UE that is handed over from LTE to GERAN/UTRAN. More generally, similar procedures may be used when a UE is handed over from a first RAN 204, operating according to a first RAT, to a second RAN 202, operating according to a second RAT.

Referring again to FIG. 2, the measurement configuration sent from the source RAN/RAT (an LTE network, in this case) to the target RAN/RAT (a GERAN/UTRAN network), is captured in the information elements that make up the IRAT Measurement Configuration IE. Details of the IRAT Measurement Configuration IE can be found in 3GPP TS 48.018, 3GPP TS 25.413, and 3GPP TS 48.008; some of those details are illustrated below, in FIGS. 3 and 4. FIG. 3 shows an IRAT Measurement Configuration Information Element (IE). FIG. 4 a structure of an IRAT Measurement Configuration IE as used for handover from LTE to UTRAN. The configuration of FIG. 4 may be sent by LTE to UTRAN/GERAN via the Source BSS to Target BSS Transparent Container IE or Old BSS to New BSS information IE (in case of handover to GERAN; see 3GPP TS 48.018 and 3GPP TS 48.008) or via the Source RNC to Target RNC Transparent Container IE (in case of handover to UTRAN, see 3GPP TS 25.413) within the handover signalling, i.e. as part of the HANDOVER REQUIRED and HANDOVER REQUEST messages generated in LTE (as shown in step 1 and step 2 of FIG. 2).

Upon reception of such configuration, the UTRAN/GERAN will need to configure the UE (handed over from LTE) to perform measurements for a time duration equal to the Measurement Duration IE and over the E-UTRAN frequencies indicated in the E-UTRA Absolute Radio-Frequency Channel Number (E-ARFCN) IE. The LTE cells for which measurements are taken will be recorded by the target UTRAN/GERAN base station if the measurement results are above preconfigured thresholds specified in the REPORTING_THRESHOLD IE or Reference Signal Received Power (RSRP) IE or Reference Signal Receive Quality (RSRQ) IE.

The measurements performed by the UE as a result of the Unnecessary IRAT Handover procedure will trigger the delivery of an HO Report IE from GERAN/UTRAN to E-UTRAN as part of a RIM message (see step 5 of FIG. 2) if the following is satisfied (excerpt from 3GPP TS 25.413 showing the conditions in UTRAN):

HO Report should be sent if there is either a single source RAT cell whose measurement results exceed the threshold for the whole measurement duration, or a group of source RAT cells together provide such coverage. The cells that exceed the threshold in the first UE measurement report are included in the HO Report. If both thresholds are present, the received radio measurements must exceed both the RSRP and the RSRQ thresholds in order to satisfy the indicated radio conditions.

When the HO Report is sent from RNC at the end of the configured measurement duration, it shall set the HO Report Type IE to "Unnecessary HO to another RAT". If the measurement period expires due to an inter-RAT handover towards LTE executed within the configured measurement duration, the RNC shall set the HO Report Type IE in the HO Report to "Early IRAT Handover".

No HO Report shall be sent in case no E-UTRAN cell could be included, or if the indicated period of time is interrupted by an inter-RAT handover to a RAT different than LTE or by an intra-UMTS handover with SRNC relocation.

As can be seen from the quote above, the HO Report IE will be generated only if there are detected cells that satisfy the measurement configuration criteria. Cells can be included in the HO Report only if reported UE measurements for each of the cells detected satisfy the configured thresholds for the whole duration of the configured measurement window or for part of such duration, in the event that the measurement window time is interrupted by an inter-RAT handover towards LTE.

In case all the conditions are satisfied, the HO Report IE sent from UTRAN/GERAN to LTE via RIM is constructed as shown in FIG. 5 (see 3GPP TS 36.413). In the HO Report IE, the cells reported in the Candidate Cell List IE are those LTE cells providing good enough coverage, namely fulfilling the criteria specified in the IRAT Measurement Configuration IE (see FIGS. 3 and 4). Such cells are represented by a list of E-UTRAN Cell Global Identities (E-CGIs). The latter can be seen from the specifications of the Candidate Cell ID IE, which is detailed as shown in FIGS. 6 and 7 (see 3GPP TS 36.413).

The discussion presented herein generally assumes a management system having an arrangement like that shown in FIG. 8. In this arrangement, node elements (NE), also referred to as eNodeBs, are managed by a domain manager (DM), also referred to as the operation and support system (OSS). A DM may further be managed by a network manager (NM). The system composed by the DM and NM may be referred as the Operation and Maintenance System (OAM). Two NEs are interfaced by X2, whereas the interface between two DMs is referred to as Itf-P2P. It is further assumed, in the discussion that follows, that a function that automatically optimizes NE parameters can, in principle, execute in the NE, DM, or NM.

SUMMARY

To unambiguously identify measured cells, the network node in a target RAT providing a Handover Report to the source RAT according to the techniques discussed above can use a global cell identifier (such as the E-UTRAN Cell Global Identifier or ECGI) that could identify each cell. However, this would require that each potential target node (e.g., each base station) be provided in advance with information sufficient to identify the cell from the non-global information that is typically available from monitoring the cell itself, such as the Physical Cell Identifier (PCI). This pre-configuration of all target nodes with this information is undesirable.

Embodiments of the presently disclosed techniques and apparatus address this and other problems. In some embodiments, in the case that the target Inter RAT node is not configured with the mapping between PCI and frequency and the cell's ECGI, given that a UE both in UTRAN and in GERAN reports a PCI and a frequency indication for a detected LTE cell, then both the PCI and the detected cell's frequency should be included in an opportune list in the HO Report IE, to assist the target eNB in unequivocally identifying the cell that was detected and reported by the UE. The embodiments described below provide for adding PCI and frequency information for cells fulfilling the Unnecessary IRAT Handover Detection criteria to the existing HO Report IE.

An example method according to some embodiments is suitable for implementation in a network node operating in a first RAN according to a first RAT. In this case, the network node is the target of an IRAT handover. The method includes receiving a handover request for a user equipment from a cell in a second RAN operating according to a second RAT and, after handover of the user equipment to a cell in the first RAN is completed, configuring the user equipment to measure one or more frequencies corresponding to the second RAN. The method includes, based on measurements reported by the user equipment for the one or more frequencies, identifying one or more detected cells exceeding a measurement threshold, and sending a handover report towards the second RAN. The handover report includes, for at least one detected cell exceeding the measurement threshold, a physical cell identifier for the detected cell and a frequency identifier for the detected cell. After sending the handover report, the network node obtains configuration information for the at least one detected cell, from another node. This configuration information can then be used for subsequent mobility procedures, such as for triggering a handover toward the at least one detected cell.

In some embodiments, the obtained configuration information includes one or more of: a global cell identifier; a tracking area identity (TAI); an LTE eNB ID; and one or more supported public land mobile network (PLMN) identifiers. In some embodiments, the obtaining of configuration information is triggered based on whether the cells detected by the user equipment are closed-subscriber-group (CSG) cells.

Obtaining the configuration information may comprise communicating with an operations and maintenance (OAM) node, in some embodiments, and receiving the configuration information from the OAM node. In other embodiments, obtaining the configuration information comprises communicating with a RAN node and receiving the configuration information from the RAN node, such as a Radio Network Controller (RNC).

In still other embodiments, obtaining the configuration information comprises requesting the user equipment to measure and report additional parameters for the at least one detected cell. In some of these embodiments, the network node requests the user equipment to read system information blocks (SIBs) for the at least one detected cell and to report one or more of a global cell identifier, a TAI, and list of PLMN IDs for the at least one detected cell. In some of these embodiments, the network node configures the user equipment to perform the measuring and reporting at a later time, when traffic loads for the user equipment are reduced.

In some embodiments, the network node receives information identifying the one or more frequencies corresponding to the second RAN in a message associated with the handover request. In some of these embodiments, the information identifying the one or more frequencies comprises an E-UTRA Absolute Radio-Frequency Channel Number (EARFCN). In some embodiments, the network node also receives, in a message associated with the handover request, measurement information indicating, for at least one of the one or more frequencies, whether or not the user equipment should measure CSG cells corresponding to the at least one of the one or more frequencies. In these embodiments, configuring the user equipment to measure one or more frequencies corresponding to the second RAN comprises configuring the user equipment to measure CSG cells or not to measure CSG cells, according to the received measurement information. The measurement indicator in some of these embodiments may be a single indicator indicating whether or not the user equipment should measure CSG cells for all of the one or more frequencies. In others of these embodiments, a separate indicator is provided for each of the one or more frequencies.

In some embodiments, the handover report includes, for at least one of the detected cells exceeding the measurement threshold, a global cell identifier. In some embodiments, a physical cell identifier and frequency identifier is included only for those detected cells for which a global cell identifier is not known or could not be derived from the measurements reported by the user equipment. As shown by the embodiments, the first and second RATs may be different RATs.

Another example method according to the present techniques is carried out in a network node operating in a first RAN according to a first RAT. In this case, the network node is the source node of an IRAT handover. The method includes initiating a handover of a user equipment from a cell in the first RAN to a cell in a second RAN, operating according to a second RAT, by sending a handover-required indication towards the second RAN. This may be done by sending a handover-required indication towards the second RAN. The example method includes, after handover of the user equipment to the cell in the second RAN is completed, receiving a handover report from the second RAN. The handover report comprises, for at least one cell detected by the user equipment, a physical cell identifier for the detected cell and a frequency identifier for the detected cell. The network node then identifies a global cell identifier for the at least one cell, based on the physical cell identifier and frequency identifier, and adjusts one or more mobility settings with respect to the cell and/or with respect to the at least one cell, in response to receiving the handover report.

In some embodiments, the method further comprises sending, towards the second RAN, information identifying one or more frequencies to be measured by the user equipment, in a message associated with the handover request. The information identifying the one or more frequencies may comprise an EARFCN, in some embodiments. In some embodiments, the network node still further sends, in a message associated with the handover request, measurement information indicating, for at least one of the one or more frequencies, whether or not the user equipment should measure CSG cells corresponding to the at least one of the one or more frequencies. This measurement information may include a single indicator indicating whether or not the user equipment should measure CSG cells for all of the one or more frequencies, in some embodiments. In others, the measurement information comprises a separate indicator for each of the one or more frequencies.

In some embodiments, the network node sends information identifying a measurement threshold in a message associated with the handover request. In some embodiments, the received handover report includes, for at least one cell detected by the user equipment, a global cell identifier.

The techniques summarized above and detailed below allow a drastic reduction of the configuration effort needed to store details about potential LTE neighbor cells on GERAN BSSs and UTRAN Radio Network Controllers (RNCs). The techniques also allow a reduction of IRAT System Information Broadcast (SIB) reading measurements for UEs in UTRAN, during the procedures of Unnecessary IRAT Handover Detection.

The methods outlined herein allow a GERAN BSS or an UTRAN RNC to discover new LTE neighboring cells that are reliable handover candidates and to trigger configuration/retrieval of information for such cells, so that procedures towards these cells (e.g., handovers) can be started when needed. Some of the methods detailed herein can also potentially limit the number of measurements performed by a UE in GERAN.

In the detailed description that follows, the several embodiments summarized above are described in detail, and descriptions of corresponding apparatus for carrying out the methods summarized above are described. It should be appreciated however, that these embodiments are intended to be illustrative, and not exhaustive.

BRIEF DESCRIPTION OF THE DRAWINGS

FIG. 3 illustrates the structure of an IRAT Measurement Configuration IE.

FIG. 4 illustrates the structure of an IRAT Measurement Configuration IE as used for handover from LTE to UTRAN.

FIG. 5 illustrates the structure of the HO Report IE message as per TS 36.413.

FIG. 6 illustrates the structure of an IRAT Cell ID.

FIG. 7 illustrates the structure of an E-UTRAN CGI (ECGI) IE.

FIG. 10 illustrates the structure of an HO Report with a Candidate PCI IE, according to some embodiments.

FIG. 11 illustrates a range bound for Candidate PCIs, according to some embodiments.

FIG. 12 illustrates the structure of a Candidate PCI IE, according to some embodiments.

DETAILED DESCRIPTION

Figure 1:
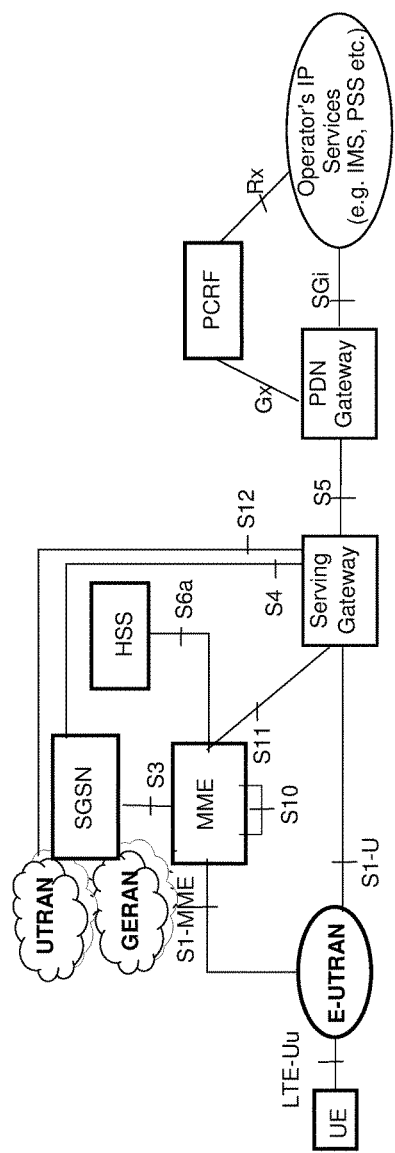
FIG. 1 is a diagram of combined LTE and GERAN/UTRAN architectures.
Figure 2:
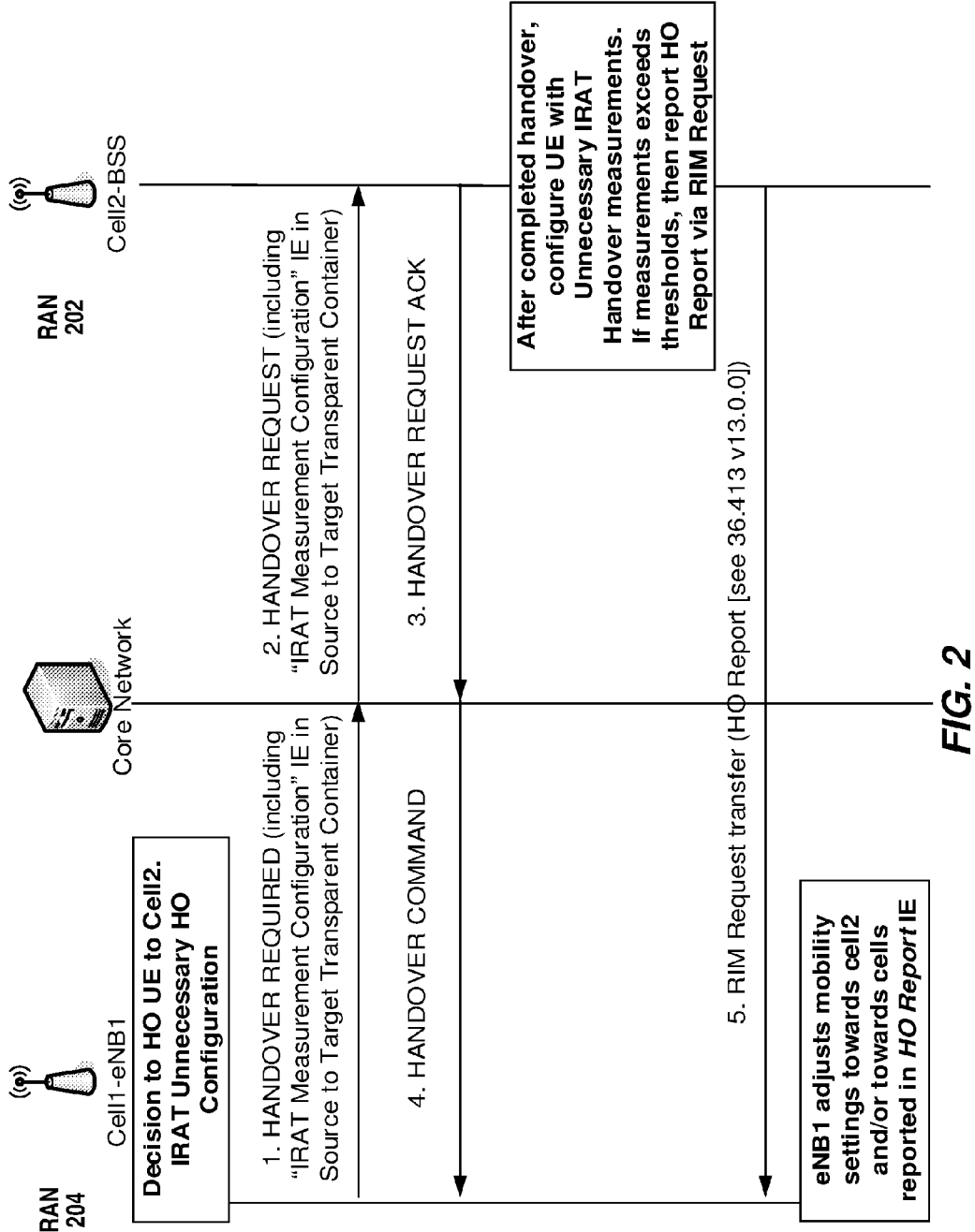
FIG. 2 is a message sequence chart for the Unnecessary IRAT Handover detection procedure, as per the current standards.
Figure 8:
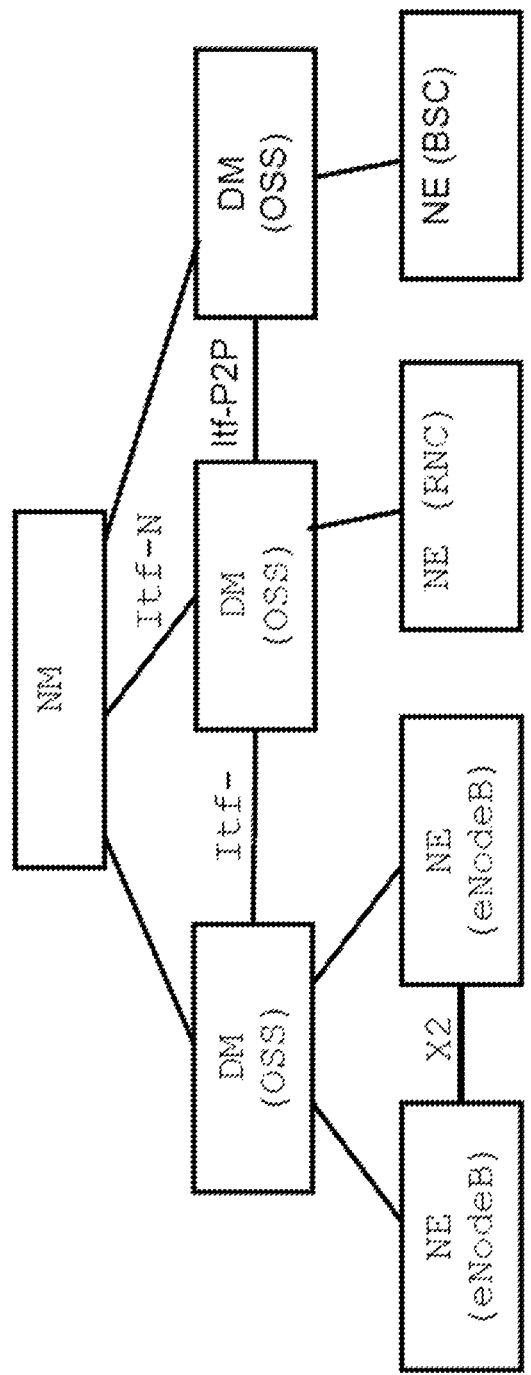
FIG. 8 is a diagram of a management system.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, embodiments of the present inventive concepts are described herein in the context of operating in or in association with a RAN that communicates over radio communication channels with mobile terminals, also interchangeably referred to as wireless terminals or UEs, using a particular RAT. More specifically, embodiments are described in the context of the E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

As used herein, the terms "mobile terminal," "wireless terminal," "user equipment," or "UE" may be used to refer to any device that receives data from and transmits data to a communication network, any of which may be, for example, a mobile telephone ("cellular" telephone), laptop/portable computer, pocket computer, hand-held computer, desktop computer, a machine to machine (M2M) or machine-type communication (MTC) device, a sensor with a wireless communication interface, etc. Devices of any of these types may be adapted, according to known techniques and according to the additional techniques disclosed herein, for operation in a device-to-device (D2D) mode, where such operation may include the transmitting and receiving of certain signals that are similar to or identical with corresponding signals used when operating within a cellular network, i.e., in a device-to-base-station operating mode.

In some embodiments, the term "network node" is used. This term may refer to any type of radio network node or other node in the fixed portion of a wireless communications network, which communicates with a UE and/or with another network node. Examples of network nodes are an eNodeB or eNB, a base station (BS), multi-standard radio (MSR) radio node such as MSR BS, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g., mobile switching center or MSC, MME etc.), O&M, OSS, self-organizing networks (SON), positioning node (e.g., Evolved Serving Mobile Location Centre, or E-SMLC), minimization of drive-testing (MDT), etc.

Several of the techniques and methods described herein are implemented using electronic data processing circuitry and other electronic hardware provided in a network node. In some cases, the network node is a base station, and thus further includes radio circuitry for communicating with one or more user equipments.

Figure 9:
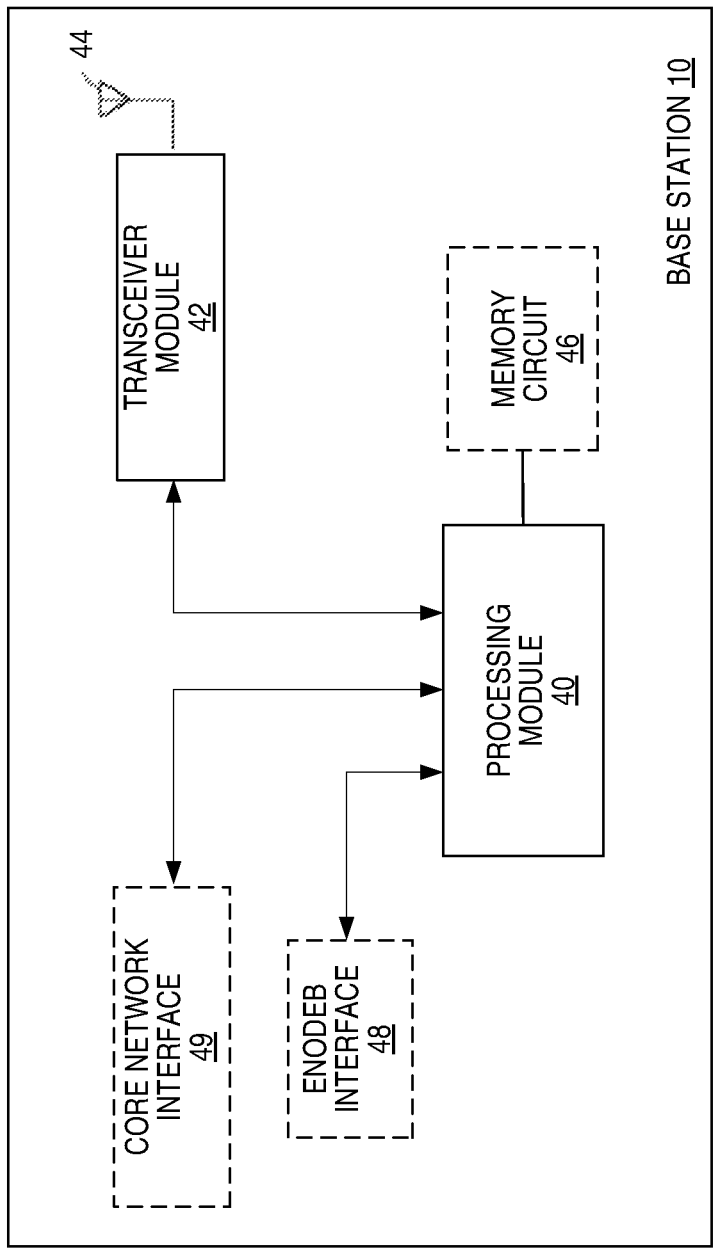
FIG. 9 is a block diagram of a network node configured to send HO Reports, according to some embodiments.

For example, FIG. 9 shows an example network node, in this case a base station 10 (for example an LTE eNodeB or a GERAN BSS), that can be used in some of the example embodiments described herein. It will be appreciated that although a macro eNB will not, in practice, be identical in size and structure to a small cell eNB, for the purposes of illustration, the base stations 10 are assumed to include similar components. Thus, whether or not base station 10 corresponds to a macro base station or a small cell base station, it comprises a processing circuit that controls the operation of the base station 10. The processing module 40, which may include one or more microprocessors, microcontrollers, digital signal processors, specialized digital logic, etc., is connected to a transceiver module 42 with associated antenna(s) 44 that are used to transmit signals to, and receive signals from, UEs in the network. The base station 10 also comprises a memory circuit 46 that is connected to the processing module 40 and that stores program and other information and data required for the operation of the base station 10. Together, the processing module 40 and memory circuit 46 may be referred to as a "processing circuit," and are adapted, in various embodiments, to carry out one or more of the network-based techniques described below.

Base station 10 also includes components and/or circuitry, such as eNodeB interface 48, for allowing the base station 10 to exchange information with other base stations 10 (for example, via an X2 interface) and components and/or circuitry, such as core network interface 49, for allowing the base station 10 to exchange information with nodes in the core network (for example, via the S1 interface). It will be appreciated that base stations for use in other types of networks (e.g., UTRAN or WCDMA RAN) will include similar components to those shown in FIG. 9 and appropriate interface circuitry 48, 49 for enabling communications with the other network nodes in those types of networks (e.g., other base stations, mobility management nodes and/or nodes in the core network).

In a working group meeting, the RAN3 working group of 3GPP agreed to a document, "Response LS on the routing information for the unnecessary handover to another RAT detection," 3GPP doc. R3-142602. The document states, "In order to avoid configuring in the BSS for each and every involved ECGI the corresponding Global eNB ID, RAN3 decided at RAN3#85bis that the source Global eNB ID should therefore also be conveyed in addition to the E-CGI and TAI." The above statement may be interpreted to say that signaling of the eNB ID (of the eNB requesting Unnecessary IRAT Handover Detection) as part of the HO Required message from source eNB to target GERAN BSS is sufficient to avoid configuring the BSS with ECGI information. The same can be said of a UTRAN RNC target. However, this assumed advantage of avoiding configuration efforts in the target BSS or target RNC is only partially valid, because knowledge of the eNB ID only avoids any need to configure the target IRAT node (the target Inter-RAT node, i.e., the node receiving handover of a UE from another RAT) of the source eNB's Global eNB ID. Namely, the target IRAT node would not need any configured parameters concerning the source eNB's cell, towards which the HO Report IE should be addressed as part of the Unnecessary IRAT Handover response. This is because the S1: HO Required message triggering Unnecessary IRAT Handover Detection would then already include the E-CGI, Tracking Area Identity (TAI), and eNB ID of the cell from which the function was initiated and where the HO Report should be routed.

However, the HO Report, constructed as shown in FIG. 5 and as explained above, includes a candidate cell list, which contains E-CGIs of cells detected by the UE while in the target RAT. Therefore, the problem of configuring a target RAT node (e.g., a GERAN BSS) with neighbor LTE cell information still applies, because the node that has to send the HO Report IE to the source eNB must be able to map the measurements provided by the UE (fulfilling the measurement configuration criteria as provided in the IRAT Measurement Configuration IE) to an E-CGI of the detected cell. This has to be done for all the reported cells satisfying the Unnecessary IRAT Handover detection criteria.

The problem can be better understood if it is considered that a UE in GERAN reports only the PCI of the detected target LTE cell, as well as an index identifying the LTE cell's frequency, such index mapping to a list of frequencies broadcast by the serving BSS to all UEs. Likewise, a UE in UTRAN would first report the PCI and target frequency of the LTE cell detected. It may be possible in UTRAN to trigger further measurements for the UE to acquire more information about the detected cell, but such extra measurements would incur long data traffic interruptions and battery consumption. Therefore, it is desirable that the UE limits LTE cell measurements to PCIs and frequencies.

For these reasons, if the E-CGI for all the LTE cells reported by the UE and fulfilling the Unnecessary IRAT HO Detection criteria must be included in the HO Report IE, then the target GERAN BSS must be configured with mapping between all of the reported PCIs and frequencies and ECGIs to be included in the HO Report IE. Likewise, if it is desired to avoid extra inter-RAT measurements, a target UTRAN RNC would need to be configured in a similar way.

The techniques and apparatus described below enable the possibility of reporting all LTE cells fulfilling the Unnecessary IRAT HO Detection criteria in the HO Report IE without the need for configuring the GERAN BSS or UTRAN RNC with global cell identifier information for all neighbor cells. Further, these techniques allow the acquisition of extra information for detected cells that fulfill the Unnecessary IRAT Handover Detection criteria.

Another problem with the current standards arises from the fact that, when requesting measurements from a UE being served in GERAN, the BSS provides the E-UTRAN frequencies for macro neighbor cells in one optional IE and the E-UTRAN frequencies for the Closed Subscriber Group (CSG) neighbor cells in another optional IE in the measurement request message. An example of such a message is the PACKET MEASUREMENT ORDER message, sent on the Packet Associated Control Channel (PACCH) from the GERAN BSS to the UE, containing E-UTRAN frequencies for macro neighbor cells in the E-UTRAN Parameters IE and E-UTRAN frequencies for CSG neighbor cells in the E-UTRAN CSG Description IE (a condition for the BSS to send the E-UTRAN CSG Description IE to the UE is that the UE has indicated support for E-UTRAN CSG Cells Reporting in its capabilities). The implication of excluding the E-UTRAN CSG Description IE from the PACKET MEASUREMENT ORDER message is that the UE will not perform any measurements on E-UTRAN CSG cells, thus the UE will not send any measurement reports to the network for this type of cells.

As described above, the IRAT Measurement Configuration IE contains a list of E-UTRAN frequencies indicated by the EARFCN IE for which the target GERAN BSS will configure the UE to perform measurements. However, the IRAT Measurement Configuration IE does not contain any information that would help the GERAN BSS to conclude whether it shall configure the UE to perform (and report) measurements on E-UTRAN CSG neighbor cells for the indicated E-UTRAN frequencies. This becomes more evident when cells are not configured in the BSS for one or more of the indicated E-UTRAN frequencies.

As a result of this, and depending on BSS implementation, E-UTRAN CSG neighbor cells may potentially be excluded when requesting measurements from the UE, hence only measurement results from E-UTRAN macro neighbor cells may be included in the HO Report IE although the intention when sending the Unnecessary IRAT Handover Detection measurement request from the source eNB was to also cover E-UTRAN CSG cells in the measurements.

It is worth noting that measurements of CSG cells are rather costly for the UE while being served in GERAN, due to the size of the routing information included in the measurement report, hence it is most likely that some BSS (again depending on implementation) will only request a UE to perform measurements on CSG cells when configured to do so.

In a similar way, a BSS that requests a UE to perform measurements on E-UTRAN macro neighbor cells as well as on E-UTRAN CSG neighbor cells for all of the E-UTRAN frequencies included in the IRAT Measurement Configuration IE, may cause an unnecessary load to the UE for the reason indicated above.

A way to obviate the first of the problems described above is to allow reporting of extra information in the HO Report IE. In particular, such extra information should not require configuration of information regarding neighbor LTE cells in the inter-RAT target node.

One proposal to include a list of detected Physical Cell Identities (PCIs) to the HO Report IE was already briefly described in a way-forward document submitted at a 3GPP working group meeting. See "Way Forward on GERAN LS on routing information for unnecessary handover," 3GPP doc. R3-142539. However, this enhancement would not be sufficient, because a PCI may be reused across different frequencies. As a result, if only a list of detected and suitable (for unnecessary IRAT Handover Detection purposes) PCIs is provided in the HO Report IE, and in the event that one or more of these PCIs are re-used across different carriers, the receiving node would not know to which cells the PCIs correspond, and would not be able to apply mobility parameters changes to prevent the unnecessary IRAT handover in a reliable way.

It is worth noting that such mobility parameter changes may consist of prioritizing one of the reported LTE cells as a handover target, in replacement of the inter-RAT handover target previously selected. Therefore, applying such adjustments to the wrong cell (wrongly identified due to reuse of the reported PCIs across different carrier frequencies) may lead to major mobility problems and to performance degradation.

A better solution, according to some embodiments, includes for the case when the target inter-RAT node is not configured with the mapping between PCI and frequency and the cell's ECGI, given that a UE both in UTRAN and in GERAN reports a PCI and a frequency indication for a detected LTE cell, then both the PCI and the detected cell's frequency should be included in an opportune list (or candidate list) in the HO Report IE, to assist the target eNB in unequivocally identifying the cell that was detected and reported by the UE. The following discussion thus includes details on how to add PCI and frequency information for cells fulfilling the Unnecessary IRAT Handover Detection criteria to the existing HO Report IE.

To further specify the measurements expected from the Unnecessary IRAT Handover Detection procedure, and by that potentially limit the number of measurements performed by the UE while served in GERAN, some extra information related to each individual E-UTRAN frequency in the IRAT Measurement Configuration IE could be supplied by the source eNB. This extra information could, for, example consist of an indicator for each individual E-UTRAN frequency, informing the BSS whether the UE (handed over from LTE) shall be configured for measurements of (1) E-UTRAN macro neighbor cells only, or (2) E-UTRAN CSG cells only, or (3) possibly both cell types for the indicated E-UTRAN frequency. As an alternative to a frequency-specific indicator, a common indicator valid for all E-UTRAN frequencies included in the IRAT Measurement Configuration IE could be supplied by the source eNB.

Thus, according to one aspect of the solutions detailed herein, a node requested to configure and collect measurement for the purpose of Unnecessary IRAT Handover Detection includes, in the report of cells fulfilling the detection criteria, cells for which cell configuration parameters such as the ECGI are not available. Instead of the EGCIs for these cells, a list of PCIs and frequency indicators for the detected cells is included in the Unnecessary IRAT Handover Detection report, named HO Report IE.

Additional aspects of the techniques and apparatus disclosed herein include methods for acquiring additional cell configuration information for the cells fulfilling the Unnecessary IRAT Handover Detection criteria, once the enhanced HO Report is sent. Some of these methods are based on signaling with OAM or signaling with other RAN nodes. Others are based on configuration of UE measurements to obtain the additional cell configuration.

Some of these aspects include implementation-specific methods according to which, once the target IRAT node detects LTE cells that fulfill the Unnecessary IRAT Handover Detection criteria, but for which extra information is not available in the target IRAT node (e.g., such cells are not configured as neighbors in the target IRAT node), the target IRAT node triggers procedures with the OAM system to gather details such as E-CGI, Tracking Area Code (TAC), eNB Identity (eNB ID), about such cells and to opportunely store them as neighbor cells.

Such procedures to gather information about opportunely detected neighbor LTE cells can be triggered with other RAN or core network (CN) nodes, in some embodiments. For example, such information could be exchanged via communication with peer RAN nodes.

Alternatively, the target IRAT node in some embodiments can trigger extra UE measurements upon detection of the PCI of the LTE cell in question, when opportune (e.g., when the UE detecting the cell is not subject to high traffic loads) and acquire the information needed to store this cell as a neighbor and to be able to trigger procedures such as handovers towards such a cell.

In some embodiments of the presently disclosed techniques, a list of PCIs and frequency identifiers such as the EUTRA Absolute Radio Frequency Channel Number (EARFCN) is added to the current HO Report IE sent over a RIM message as part of the SON Transfer Request Container specified in 3GPP TS 36.413. Each PCI included in such a list corresponds to a cell, detected and reported by the UE configured with measurements for the Unnecessary Inter RAT Handover Detection function, which has fulfilled the measurement conditions specified in the measurement configuration sent to the target IRAT node via handover signaling. As noted above, each PCI included in the list by the target IRAT node may not have a corresponding ECGI available at the target IRAT node. In some embodiments, the PCI and frequency identifier are included only if the corresponding ECGI has not been added in the existing Candidate Cell List IE of the HO Report IE.

One possibility for the frequency identifier is the EARFCN, which points at the center frequency of an LTE carrier. Such parameter can be also replaced by an indication of a carrier frequency band or frequency band on which the UE in the target IRAT node was configured to perform measurements that brought to the discovery of the corresponding PCI. For the sake of simplicity the term "frequency identifier" will be used to specify any parameter such as an EARFCN, or a carrier frequency or a cell frequency or the frequency on which the UE in the target IRAT node was configured to perform the measurements that lead to the detection of the corresponding PCI.

According to this approach, the PCI and frequency identifier are sent together in the HO Report IE if a detected cell fulfills the Unnecessary IRAT Handover Detection criteria and if the target IRAT node cannot deduce a corresponding ECGI. In some embodiments, a way to amend the current specifications to achieve this is shown in FIGS. 10 and 11, where a Candidate PCI List is added to the structure of the HO Report IE. FIG. 12 shows an implementation of the added Candidate PCI List added to the 3GPP standards, which contains the PCI and the EARFCN of the detected cell.

As can be seen from the example in FIG. 10, the semantics description of the Candidate PCI IE explains that the presence of cells reported by means of PCI and EARFCN (or indeed any of the Frequency Identifiers described above) excludes the presence of the same cells in the existing Candidate Cell List IE. Indeed, if for such cells the ECGI can be derived by the target RAT node, the cell shall be reported by means of its ECGI in the Candidate Cell List IE. The latter would avoid any confusion at the node receiving the HO Report IE, such confusion for example consisting of receiving the same cell twice, once in the Candidate Cell List IE and another time in the Candidate PCI List IE. The latter might lead the receiving node to understand that the cell reported by means of its PCI is not configured (e.g., is not stored as a neighbor) in the target IRAT node and as a consequence mechanisms may be triggered to ensure that the cell is configured at the target IRAT node.

However, in an alternative approach, it would be possible for the same cell to be identified in both the Candidate Cell List IE and the Candidate PCI List IE, provided that the receiving node understands that the cell reported in both lists is configured at the target IRAT node.

To control the amount and type of information provided in the HO Report IE as per previous embodiments, some embodiments of the techniques described above provide for an indication to be provided from the source eNB to the target IRAT node, the indication indicating whether or not cells transmitting a CSG ID should be included in the Unnecessary IRAT Handover Detection and reporting mechanism. In various embodiments or instances, they could be included together with other cells or included alone, i.e. only cells transmitting a CSG ID—closed, hybrid, or both—could be included, or excluded. Such indication may comprise information on whether to include CSG cells, namely cells that can only be accessible by UEs that are member of the CSG ID; hybrid cells, i.e., cells provided with a CSG ID and accessible to all UEs but where UEs that are member of the CSG ID may be treated in a prioritized way, or both closed and hybrid cells. The indication may indicate whether to include closed cells and/or hybrid cells alone or whether to include closed cells and/or hybrid cells with other cells. The indication could be provided as part of the IRAT Measurement Configuration IE as discussed above, namely for both the cases of target GERAN RAT and target UTRAN RAT. The indication may be provided on a per EARFCN indicated by source eNB for Unnecessary IRAT Handover Detection, or as a general indication for all the EARFCNs indicated in the IRAT Measurement Configuration IE. With such indication, the target RAT node may understand whether to collect measurements and run the unnecessary IRAT Handover detection for CSG-type cells (i.e. closed or hybrid cells) in addition to (or instead of) non-CSG-type cells.

In an extension of such embodiments, when the target IRAT node identifies that there are cells reported by the UE that fulfill the Unnecessary IRAT Handover Detection criteria and for which further information is not available (such as the cell's ECGI, TAC, eNB ID), the target IRAT node triggers communication with the OAM system in order to receive configuration information providing further details about the detected cell. Such triggering may depend on whether the Unnecessary IRAT Handover Detection mechanism was configured to report CSG type cells or not. For example, if the detection was configured to report CSG type cells and if all the cells detected have PCIs in the range of PCIs dedicated to closed cells, the process of further information gathering may not be triggered, in some embodiments.

The OAM system may provide a list of cell parameters such as ECGI, TAI, eNB ID, supported PLMN IDs, for the cell in question. The OAM system may also establish a neighbor relation between the cell serving the UE that detected the LTE cell and the LTE cell detected. This neighbor relation may allow the target IRAT node to trigger handovers towards the detected LTE cell in the future.

It should be noted that establishing a neighbor relation with the detected LTE cell, for example, for future handover procedures is very useful, because the LTE cell in question was detected to provide good coverage for a given period of time to UEs connected to the target IRAT node. Therefore, this cell could be a potential handover candidate in the future.

In another extension of the above-described methods, once a neighbor LTE cell fulfilling the Unnecessary IRAT Handover Detection criteria and for which further information is not available (such as the cell's ECGI, TAC, eNB ID) is detected, the handover target RAT node can trigger procedures with other RAN nodes in order to obtain information about such a cell. In an embodiment where the target RAT node is a UTRAN RNC, such procedures may be the INFORMATION EXCHANGE INITIATION REQUEST/RESPONSE, which allow requesting Automatic Neighbor Relation (ANR) information. The information includes lists of cells and their corresponding cell parameters (e.g., ECGI, PCI) for which a neighbor node has a neighbor relation. By acquiring information from neighbor nodes about the cells that are configured as neighbor (or in general for cells for which the neighbor node has information that can be mapped to an LTE cell's PCI), the node where the LTE cell's PCI was detected can acquire further information about the LTE cell detected and use such information for further procedures. Such gathering of information may depend on whether the Unnecessary IRAT Handover Detection mechanism was configured to report CSG type cells or not. For example, if the detection was configured to report CSG type cells and if all the cells detected have PCIs in the range of PCIs dedicated to closed cells, the process of further information gathering may not be triggered.

In still another extension of the above-described methods, once a neighbor LTE cell fulfilling the Unnecessary IRAT Handover Detection criteria and for which further information is not available (such as the cell's ECGI, TAC, eNB ID) is detected, the handover target RAT node can trigger UE measurements requesting the UE to measure further parameters of the detected cell. For example, in the case where the node where the LTE cell is detected is a UTRAN RNC, the node may ask the UE that detected the cell to read the System Information Blocks (SIBs) of the detected cell and report information such as the cell's ECGI, TAI, list of PLMN IDs. A UTRAN RNC may also configure UEs to perform such measurements at a later stage, for example, when traffic loads for a suitable UE that detects the same PCI are reduced. Such triggering of measurements may depend on whether the Unnecessary IRAT Handover Detection mechanism was configured to report CSG type cells or not. For example, if the detection was configured to report CSG type cells and if all the cells detected have PCIs in the range of PCIs dedicated to closed cells, the process of further information gathering may not be triggered.

In the case of a GERAN BSS, and if the LTE cell is a CSG cell, the BSS can configure the UE to read the cell's SIBs and report further information about the cell.

By acquiring further information about the LTE cell for which a PCI and frequency indication was reported by a UE and that fulfills the Unnecessary IRAT Handover Detection criteria, the node is able to use such information to trigger further procedures such as handovers towards such cell.

Figure 13:
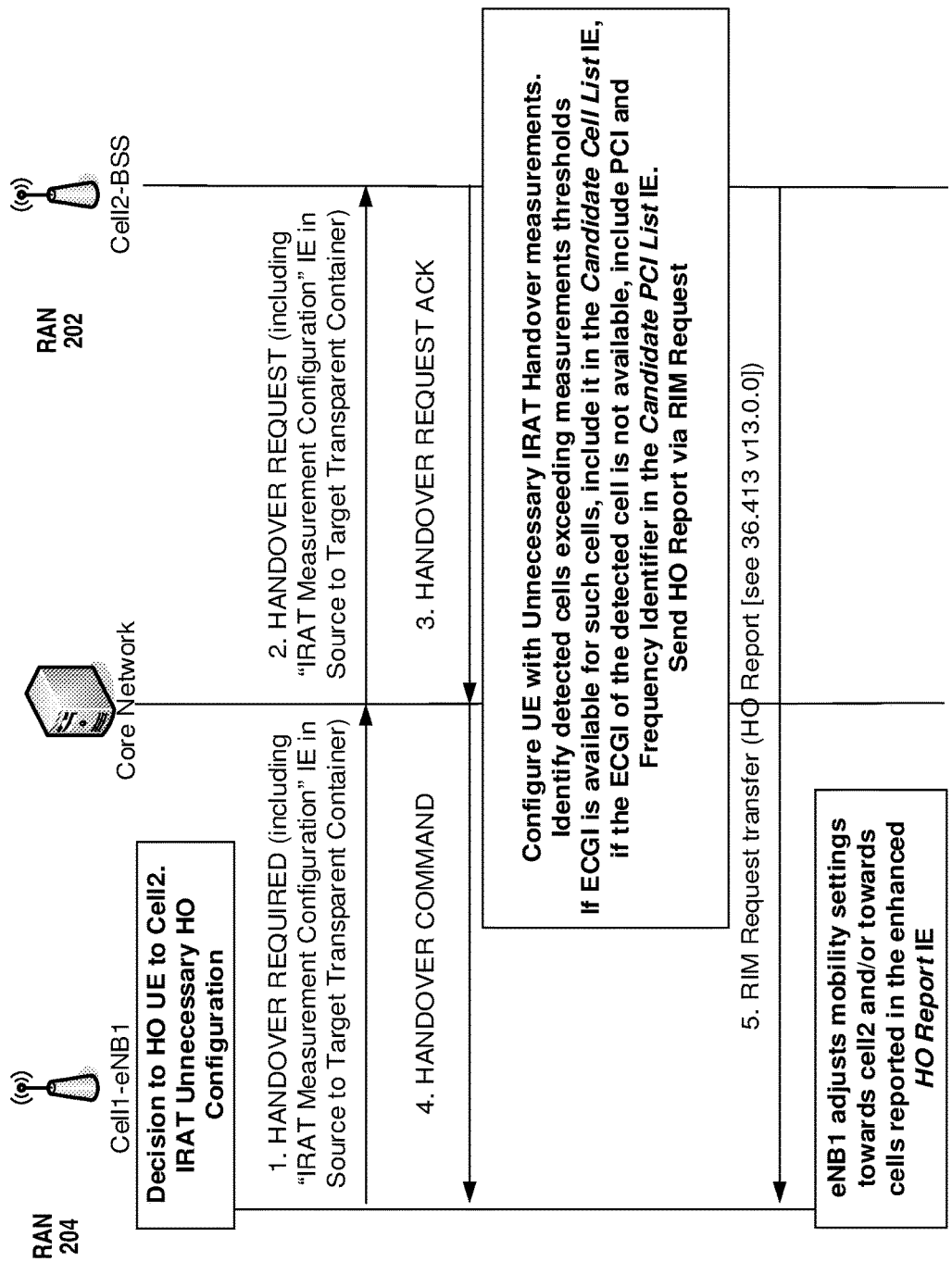
FIG. 13 is a message sequence chart for enhancement of a HO Report with PCI and frequency identifier of suitable LTE cells, according to some embodiments.

FIG. 13 illustrates an example message flow for the Unnecessary IRAT Handover Detection procedure as modified by the techniques described herein. In this non-limiting example, the base station of the first RAN 204 is an LTE eNodeB, and decides to handover a UE to another cell. The target cell is served by the base station of the target RAN 202, which is a GERAN BSS. In step 1, the eNodeB of the first RAN 204 indicates to the core network that a handover is required for a UE in the cell of the first RAN 204. The HANDOVER REQUIRED message may include an IRAT Measurement Configuration IE, as shown in FIG. 4. In step 2, the core network sends a HANDOVER REQUEST message to the GERAN BSS of the target RAN 202. Steps 3 and 4 show a HANDOVER REQUEST ACK and a HANDOVER COMMAND.

At this point, the GERAN BSS configures the UE with Unnecessary IRAT Handover measurements. Detected cells with measurements that exceed measurement thresholds are identified. If the GERAN BSS determines that an ECGI is available for a cell, it is included in the Candidate Cell List IE of a HO Report IE to be sent to the eNodeB. If the GERAN BSS determines that an ECGI is not available, a PCI and Frequency Identifier are included in the Candidate PCI List IE of the HO Report IE. The Frequency Identifier can be a EARFCN.

At step 5, a RIM Request transfer is sent to the eNodeB and may include the HO Report IE. The eNodeB identifies cells by the ECGI in the Candidate Cell List IE. The eNodeB also identifies cells that do not have ECGIs in the Candidate Cell List IE by the PCI and EARFCN in the Candidate PCI List IE. In some cases, this may include determining the ECGI for such a cell from the PCI and EARFCN. The eNodeB then adjusts mobility settings towards the target cell of the target RAN 202 or to detected cells reported in the HO Report IE, which has been enhanced in this embodiment by the Candidate PCI List IE.

Figure 14:
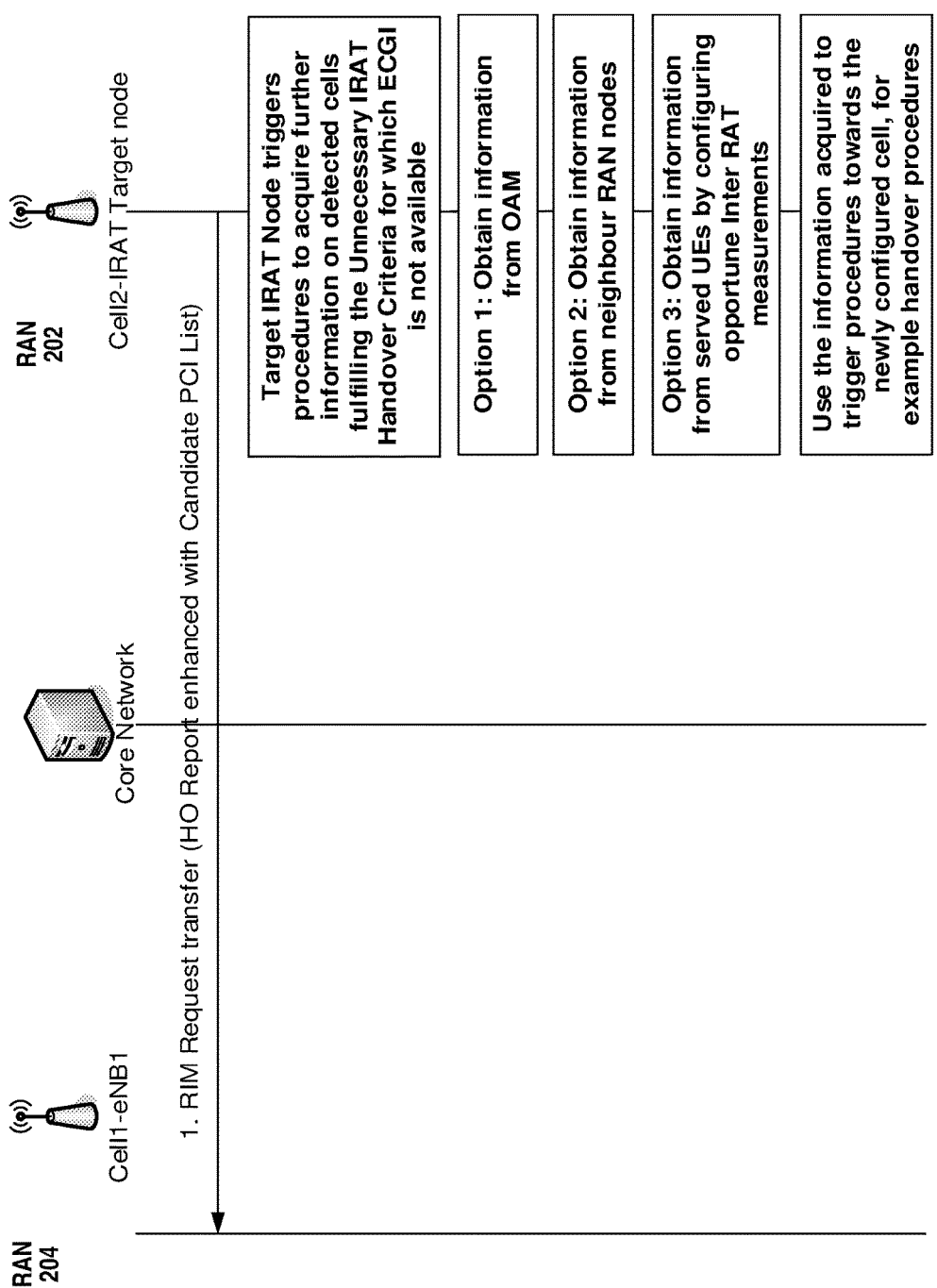
FIG. 14 is a message sequence chart for acquiring cell parameters in response to Unnecessary IRAT Handover detection, according to some embodiments.

FIG. 14 shows an example message flow diagram for the extended techniques described above. For example, following a RIM Request Transfer, the node of RAN 202 triggers procedures to acquire further information. The information may be obtained from the OAM, neighbor RAN nodes, and served UEs. The information may be used to trigger procedures towards the newly configured cell.

Given the above detailed examples of techniques for improving the Unnecessary IRAT Handover detection process, it should be appreciated that these techniques may be applied more generally. FIG. 15 illustrates an example method 1500 that may be carried out by a network node operating in a first RAN 202 according to a first RAT. In this case, the network node is a base station, such as base station 10, for the cell targeted in an IRAT handover.

As shown at blocks 1510 and 1540, the method 1500 includes receiving a handover request for a user equipment from a cell in the second RAN 204 operating according to a second RAT and, after handover of the user equipment to a cell in the first RAN 202 is completed, configuring the user equipment to measure one or more frequencies corresponding to the second RAN 204. The method 1500 includes, based on measurements reported by the user equipment for the one or more frequencies for which the user equipment was configured to measure, identifying one or more detected cells exceeding a measurement threshold, as shown at block 1550, and sending a handover report towards the second RAN 204, as shown at block 1560. The handover report comprises, for at least one detected cell exceeding the measurement threshold, a physical cell identifier for the detected cell and a frequency identifier for the detected cell.

In some embodiments, the network node receives information identifying the one or more frequencies corresponding to the second RAN 204 in a message associated with the handover request. This is shown at block 1520. In some of these embodiments, the information identifying the one or more frequencies comprises an EARFCN. In further embodiments, the network node also receives, in a message associated with the handover request, measurement information indicating, for at least one of the one or more frequencies, whether or not the user equipment should measure CSG cells corresponding to the at least one of the one or more frequencies. This is shown at block 1530. In these embodiments, configuring the user equipment to measure one or more frequencies corresponding to the second RAN 204 comprises configuring the user equipment to measure CSG cells or not to measure CSG cells, according to the received measurement information. The measurement indicator in some of these embodiments may be a single indicator indicating whether or not the user equipment should measure CSG cells for all of the one or more frequencies. In others of these embodiments, a separate indicator is provided for each of the one or more frequencies.

In some embodiments, the handover report includes, for at least one of the detected cells exceeding the measurement threshold, a global cell identifier. In some embodiments, a physical cell identifier and frequency identifier is included only for those detected cells for which a global cell identifier is not known could not be derived from the measurements reported by the user equipment.

Blocks 1570 and 1580 of FIG. 15 illustrate additional steps that may be taken by a target IRAT node, in some embodiments. As shown at block 1570, after sending the handover report, the network node obtains configuration information for the at least one detected cell, from another node. As shown at block 1580, this configuration information can then be used for subsequent mobility procedures, such as for triggering a handover toward the at least one detected cell.

In some embodiments, the obtained configuration information includes one or more of: a global cell identifier; a TAI; an LTE eNB ID; and one or more supported PLMN identifiers. In some embodiments, the obtaining of configuration information is triggered based on whether the cells detected by the user equipment are CSG cells.

As discussed above, obtaining configuration information may comprise communicating with an OAM node, in some embodiments, and receiving the configuration information from the OAM node. In other embodiments, obtaining the configuration information comprises communicating with a RAN node and receiving the configuration information from the RAN node, such as an RNC.

In still other embodiments, obtaining the configuration information comprises requesting the user equipment to measure and report additional parameters for the at least one detected cell. In some of these embodiments, the network node requests the user equipment to read system SIBs for the at least one detected cell and to report one or more of a global cell identifier, a TAI, and list of PLMN IDs for the at least one detected cell. In some of these and in some embodiments, the network node configures the user equipment to perform the measuring and reporting at a later time, when traffic loads for the user equipment are reduced.

Figure 15A:
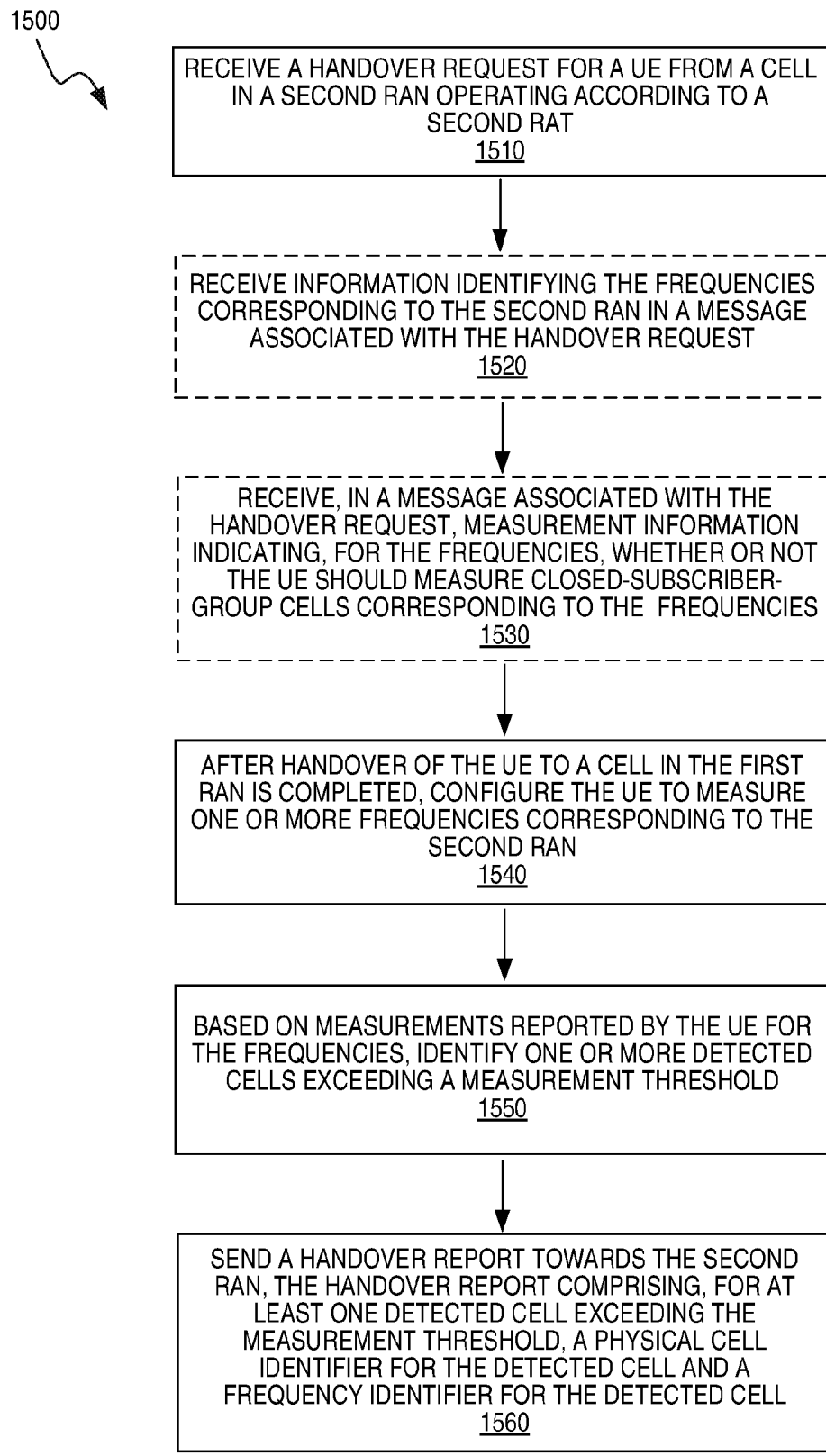
FIGS. 15A-15B show a flowchart illustrating a method for sending HO Reports and for obtaining and using configuration information for mobility procedures, according to some embodiments.
Figure 15B:
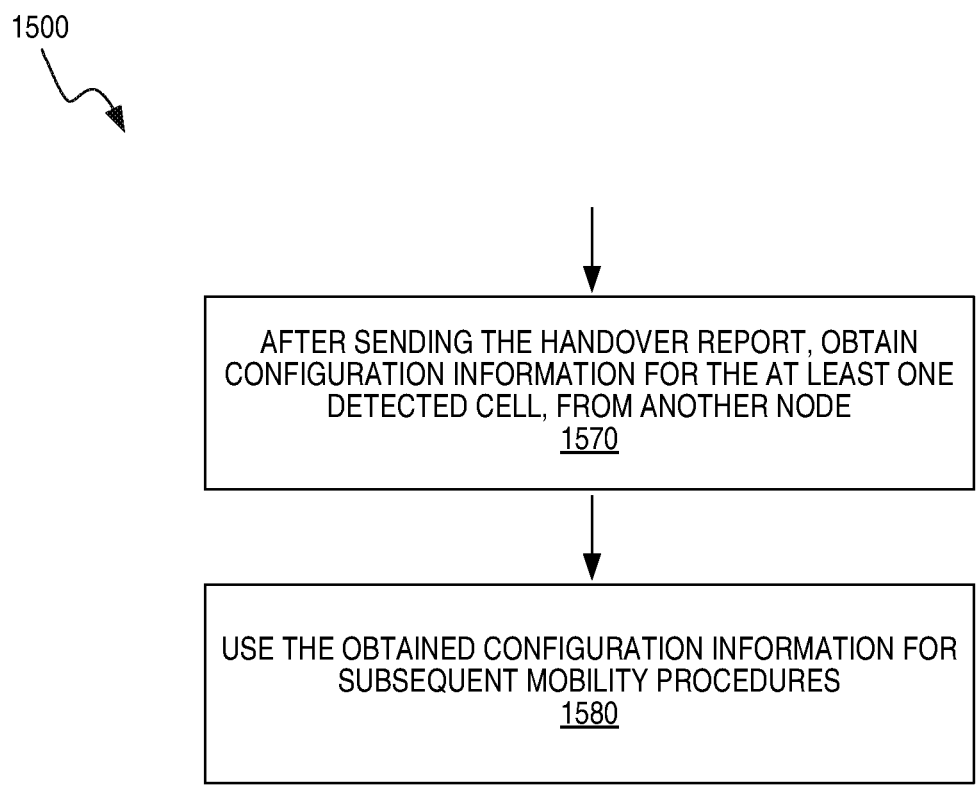
Figure 16:
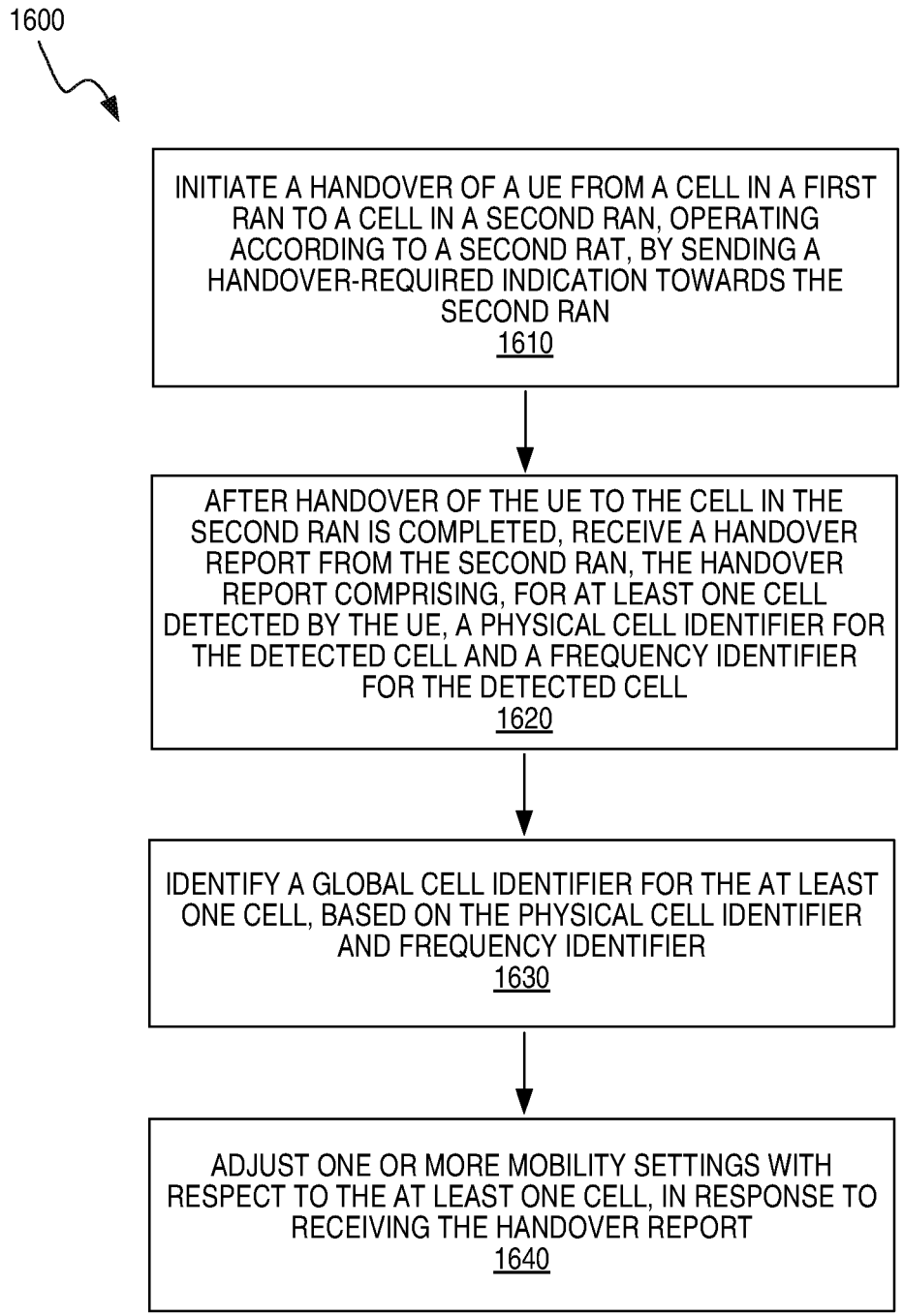
FIG. 16 is a flowchart illustrating a method for adjusting mobility settings in response to a HO Report, according to some embodiments.

FIG. 16 illustrates another example method 1600 according to the present techniques, again carried out in a network node, such as base station 10, operating in a first RAN 204 according to a first RAT. In this case, however, the network node is the source node of an IRAT handover, rather than the target node as in FIG. 15. Thus, the "first" RAN and "first" RAT in this case may differ from the first RAN and first RAT discussed in connection with FIG. 15. For example, the first RAN in FIG. 15 was RAN 202. In FIG. 16, the first RAN is RAN 204.

As shown at block 1610, the example method 1600 includes initiating a handover of a user equipment from a cell in the first RAN 204 to a cell in the second RAN 202, by sending a handover-required indication towards the second RAN 202. After handover of the user equipment to the cell in the second RAN 202 is completed, the network node receives a handover report from the second RAN 202, as shown at block 1620. The handover report comprises, for at least one cell detected by the user equipment, a physical cell identifier for the detected cell and a frequency identifier for the detected cell. As shown at block 1630, the network node then identifies a global cell identifier for the at least one cell, based on the physical cell identifier and frequency identifier. As shown at block 1640, the network node adjusts one or more mobility settings with respect to the cell in the second RAN 202 and/or with respect to the at least one cell detected by the user equipment, in response to receiving the handover report.

In some embodiments, the method further comprises sending, towards the second RAN 202, information identifying one or more frequencies to be measured by the user equipment, in a message associated with the handover-required indication. (This may be same message as the handover request, in some embodiments). The information identifying the one or more frequencies may comprise an EARFCN. In some embodiments, the network node still further sends, in a message associated with the handover-required indication, measurement information indicating, for at least one of the one or more frequencies, whether or not the user equipment should measure CSG cells corresponding to the at least one of the one or more frequencies. This measurement information may include a single indicator indicating whether or not the user equipment should measure CSG cells for all of the one or more frequencies, in some embodiments. In others, the measurement information comprises a separate indicator for each of the one or more frequencies.

In some embodiments, the network node sends information identifying a measurement threshold in a message associated with the handover-required indication. In some embodiments, the received handover report includes, for at least one cell detected by the user equipment, a global cell identifier.

Embodiments of the presently disclosed techniques include the several methods described above, including the methods 1500 and 1600 illustrated in the process flow diagrams of FIGS. 15A-B and 16, as well as variants thereof. Other embodiments include network node apparatuses configured to carry out one or more of these methods. In some embodiments of the invention, processing circuits, such as the processing module 40 and memory circuit 46 of FIG. 9, are configured to carry out one or more of the techniques described in detail above. Likewise, other embodiments may include network nodes that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will further be appreciated that various aspects of the above-described embodiments can be understood as being carried out by functional "modules" corresponding to the method steps illustrated in FIGS. 15A-B and 16. These functional modules may be program instructions executing on an appropriate processor circuit, hard-coded digital circuitry and/or analog circuitry, or appropriate combinations thereof, e.g., in network nodes having hardware configurations like that shown in FIG. 9.

Figure 17:
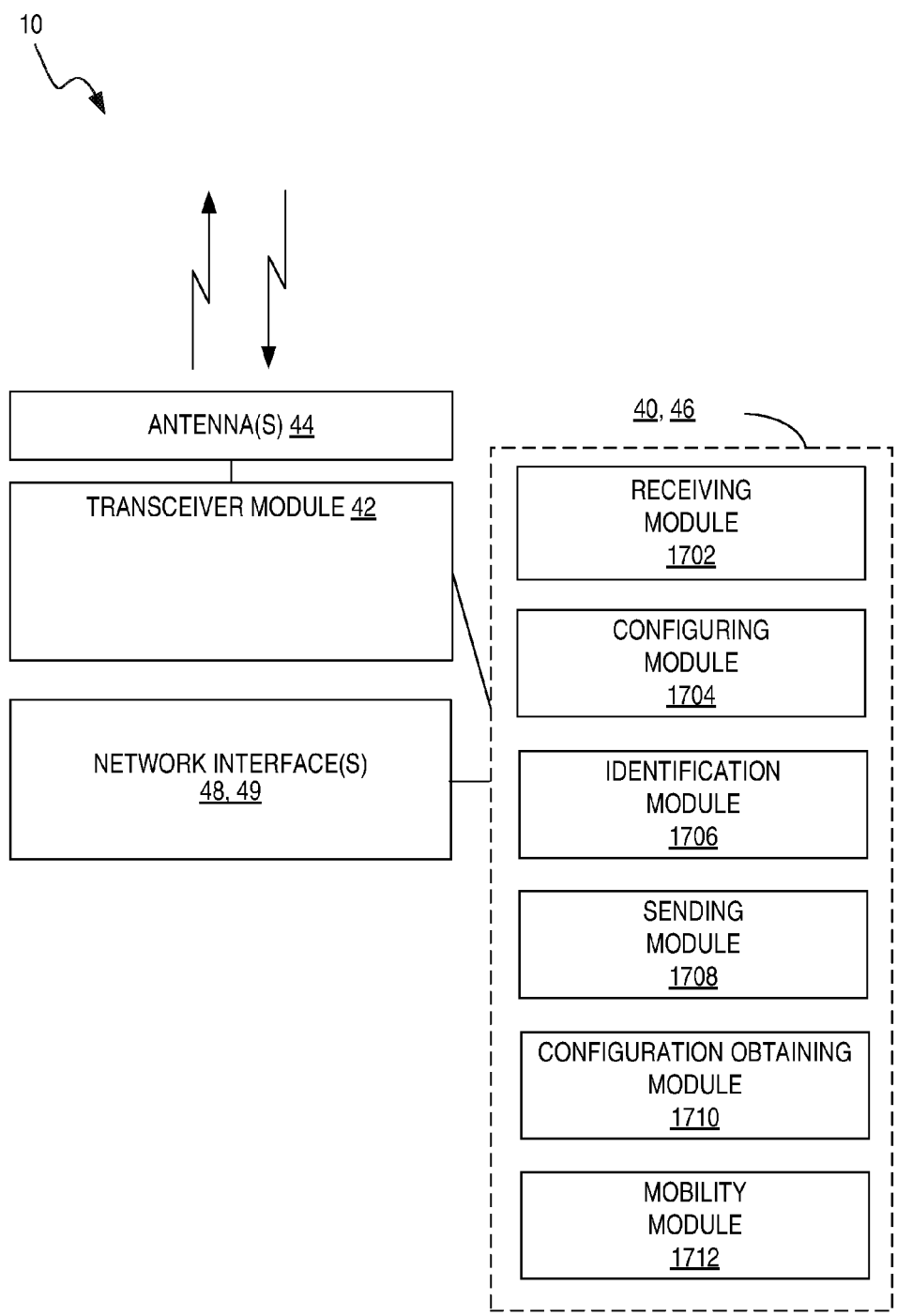
FIG. 17 is a block diagram of a functional implementation of a network node for obtaining and using configuration information for mobility procedures, according to some embodiments.

For example, FIG. 17 illustrates an example functional module or circuit architecture as may be implemented in base station 10, e.g., based on the processing module 40 and memory circuit 46, of a first RAN operating according to a first RAT. The illustrated embodiment at least functionally includes a receiving module 1702 for receiving a handover request for a user equipment from a cell in a second RAN operating according to a second RAT. The implementation also includes a configuration module 1704 for, after handover of the user equipment to a cell in the first RAN is completed, configuring the user equipment to measure one or more frequencies corresponding to the second RAN. The implementation includes an identifying module 1706 for, based on measurements reported by the user equipment for the one or more frequencies, identifying one or more detected cells exceeding a measurement threshold. The implementation further includes a sending module 1708 for sending a handover report towards the second RAN. The handover report includes, for at least one detected cell exceeding the measurement threshold, a physical cell identifier for the detected cell and a frequency identifier for the detected cell. The implementation includes a configuration obtaining module 1710 for, after sending the handover report, obtaining configuration information for the at least one detected cell, from another node. The implementation also includes a mobility module 1712 for using the obtained configuration information for subsequent mobility procedures.

It will be appreciated by the person of skill in the art that various modifications may be made to the above-described embodiments without departing from the scope of the present invention. For example, although embodiments of the present invention have been described with examples that reference a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a network node operating in a first radio access network (RAN) according to a first radio access technology (RAT), the method comprising:

receiving a handover request for a user equipment from a cell in a second RAN operating according to a second RAT;

after handover of the user equipment to a cell in the first RAN is completed, configuring the user equipment to measure one or more frequencies corresponding to the second RAN;

based on measurements reported by the user equipment for the one or more frequencies, identifying one or more detected cells exceeding a measurement threshold;

sending a handover report towards the second RAN, the handover report comprising, for at least one detected cell exceeding the measurement threshold, a physical cell identifier for the detected cell and a frequency identifier for the detected cell;

after sending the handover report, obtaining configuration information for the at least one detected cell, from another node; and using the obtained configuration information for subsequent mobility procedures.

2. The method of claim 1, wherein obtaining configuration information comprises obtaining one or more of for the at least one detected cell:

a global cell identifier;

a tracking area identity (TAI);

a Long Term Evolution (LTE) eNodeB ID; and one or more supported public land mobile network (PLMN) identifiers.

3. The method of claim 1, wherein obtaining configuration information comprises communicating with an operations and maintenance (OAM) node and receiving the configuration information from the OAM node.

4. The method of claim 1, wherein obtaining configuration information comprises communicating with a RAN node and receiving the configuration information from the RAN node.

5. The method of claim 4, wherein the RAN node is a Radio Network Controller (RNC).

6. The method of claim 1, wherein obtaining configuration information comprises requesting the user equipment to measure and report additional parameters for the at least one detected cell.

7. The method of claim 6, wherein requesting the user equipment to measure and report additional parameters comprises requesting the user equipment to read system information blocks (SIBs) for the at least one detected cell and to report one or more of a global cell identifier, a TAI, and list of public land mobile network (PLMN) IDs for the at least one detected cell.

8. The method of claim 6, wherein requesting the user equipment to measure and report additional parameters comprises configuring the user equipment to perform the measuring and reporting at a later time, when traffic loads for the user equipment are reduced.

9. The method of claim 1, wherein the obtaining of configuration information is triggered based on whether the cells detected by the user equipment are closed-subscriber-group (CSG) cells.

10. The method of claim 1, wherein using obtained configuration for subsequent mobility procedures comprises triggering a handover toward the at least one detected cell.

11. A network node apparatus configured to operate in a first radio access network (RAN) according to a first radio access technology (RAT), the network node apparatus comprising a processing circuit configured to:

receive a handover request for a user equipment from a cell in a second RAN operating according to a second RAT;

after handover of the user equipment to a cell in the first RAN is completed, configure the user equipment to measure one or more frequencies corresponding to the second RAN;

based on measurements reported by the user equipment for the one or more frequencies, identify one or more detected cells exceeding a measurement threshold;

send a handover report towards the second RAN, the handover report comprising, for at least one detected cell exceeding the measurement threshold, a physical cell identifier for the detected cell and a frequency identifier for the detected cell;

after sending the handover report, obtain configuration information for the at least one detected cell, from another node; and use the obtained configuration information for subsequent mobility procedures.

12. The network node apparatus of claim 11, wherein the processing circuit is configured to obtain configuration information by obtaining one or more of for the at least one detected cell:
   a global cell identifier;
   a tracking area identity (TAI);
   a Long Term Evolution (LTE) eNodeB ID; and
   one or more supported public land mobile network (PLMN) identifiers.

13. The network node apparatus of claim 11, wherein the processing circuit is configured to obtain configuration information by communicating with an operations and maintenance (OAM) node and receiving the configuration information from the OAM node.

14. The network node apparatus of claim 11, wherein the processing circuit is configured to obtain configuration information by communicating with a RAN node and receiving the configuration information from the RAN node.

15. The network node apparatus of claim 14, wherein the RAN node is a Radio Network Controller (RNC).

16. The network node apparatus of claim 11, wherein the processing circuit is configured to obtain configuration information by requesting the user equipment to measure and report additional parameters for the at least one detected cell.

17. The network node apparatus of claim 16, wherein the processing circuit is configured to request the user equipment to measure and report additional parameters by requesting the user equipment to read system information blocks (SIBs) for the at least one detected cell and to report one or more of a global cell identifier, a TAI, and list of public land mobile network (PLMN) IDs for the at least one detected cell.

18. The network node apparatus of claim 16, wherein the processing circuit is configured to request the user equipment to measure and report additional parameters by configuring the user equipment to perform the measuring and reporting at a later time, when traffic loads for the user equipment are reduced.

19. The network node apparatus of claim 11, wherein the processing circuit is configured to trigger obtaining of configuration information based on whether the cells detected by the user equipment are closed-subscriber-group (CSG) cells.

20. The network node apparatus of claim 11, wherein the processing circuit is configured to use the obtained configuration for subsequent mobility procedures for triggering a handover toward the at least one detected cell.

21. A non-transitory computer-readable medium comprising, stored thereupon, a computer program product comprising program instructions for a processor in a network node, wherein said program instructions are configured so as to cause the network node, when the program instructions are executed by the processor, to:

receive a handover request for a user equipment from a cell in a second RAN operating according to a second RAT;

after handover of the user equipment to a cell in the first RAN is completed, configure the user equipment to measure one or more frequencies corresponding to the second RAN;

based on measurements reported by the user equipment for the one or more frequencies, identify one or more detected cells exceeding a measurement threshold;

send a handover report towards the second RAN, the handover report comprising, for at least one detected cell exceeding the measurement threshold, a physical cell identifier for the detected cell and a frequency identifier for the detected cell;

after sending the handover report, obtain configuration information for the at least one detected cell, from another node; and use the obtained configuration information for subsequent mobility procedures.

* * * * *

UNITED STATES PATENT AND TRADEMARK OFFICE
CERTIFICATE OF CORRECTION

PATENT NO. : 9,736,742 B2
APPLICATION NO. : 15/100126
DATED : August 15, 2017
INVENTOR(S) : Centonza et al.

Page 1 of 1

It is certified that error appears in the above-identified patent and that said Letters Patent is hereby corrected as shown below:

In the Drawings

In Fig. 5, Sheet 5 of 18, under "Semantics description", in Line 5, delete "25 413" and insert -- 25.413 --, therefor.

In Fig. 5, Sheet 5 of 18, under "Semantics description", in Line 13, delete "48 018" and insert -- 48.018 --, therefor.

In the Specification

In Column 2, Line 15, delete "FIG. 4 a" and insert -- FIG. 4 illustrates a --, therefor.

In Column 5, Line 57, delete "Broadcast (SIB)" and insert -- Block (SIB) --, therefor.

In Column 11, Line 8, delete "EGCIs" and insert -- ECGIs --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*